July 29, 1969 D. J. LESLIE 3,458,642

ELECTRONIC ORGAN UTILIZING PROPORTIONAL FREQUENCY CHANGERS FOR HARMONIC STRUCTURE

Filed Feb. 1, 1966 2 Sheets-Sheet 1

INVENTOR.
DONALD J. LESLIE
By Flam and Flam
ATTORNEYS.

July 29, 1969 D. J. LESLIE 3,458,642

ELECTRONIC ORGAN UTILIZING PROPORTIONAL FREQUENCY CHANGERS FOR HARMONIC STRUCTURE

Filed Feb. 1, 1966 2 Sheets-Sheet 2

INVENTOR.
DONALD J. LESLIE
By Flam and Flam
ATTORNEYS.

United States Patent Office 3,458,642
Patented July 29, 1969

3,458,642

ELECTRONIC ORGAN UTILIZING PROPORTIONAL FREQUENCY CHANGES FOR HARMONIC STRUCTURE

Donald J. Leslie, Altadena, Calif. 91101
(267 S. Fair Oaks Ave., Pasadena, Calif.)

Filed Feb. 1, 1966, Ser. No. 524,257
Int. Cl. G10h *1/06*
U.S. Cl. 84—1.01 12 Claims

ABSTRACT OF THE DISCLOSURE

An electronic musical instrument produces composite tones from a single set of sine wave generators by the aid of proportional frequency changers. Bus leads corresponding to the harmonics connect with the audio output channel through circuit elements adjustable for shaping the output. The first set of bus leads connect to the sine wave generators through key switches to provide the fundamental and certain harmonics all on the well known "borrowing" principle. Bus leads of the second set (for example, for the 7th, 9th and higher order harmonics) connect to other bus leads through a proportional frequency changer. For example, the bus lead for the 7th harmonic may connect to the bus lead for the 8th harmonic through a proportional frequency changer that changes frequencies by the factor ⅞.

Brief summary of the invention

This invention relates to electronic organs, and particularly to electronic organs of the type in which sine wave generators are provided for each note of the musical range and in which harmonics are added by borrowing signals from sine wave generators for other notes. For example, the second, third, fourth, fifth, sixth and eighth harmonics of $A_4$ may be derived by borrowing, in selected amounts, signals from the sine wave generators for $A_5$, $E_6$ $A_6$, $C\#_7$, $E_7$ and $A_7$. The generators for $A_5$, $A_6$ and $A_7$ have frequencies that are precisely twice, four times and eight times the frequency of the generator for $A_4$, assuming that the generators are properly tuned. Accordingly, the octave harmonics are true. The generators for $E_5$, $C\#_7$ and $E_7$ have frequencies that are not exactly three, five and six times the frequency of $A_4$; yet they are sufficietly close to provide simulation. However, while the $C\#_7$ is commercially used for the fifth harmonic, its frequency is considerably sharp, and noticeable improvement could be obtained if the correct frequency were available.

Moreover, generators are not available that closely approach the seventh, eleventh, thirteenth and other harmonics, particularly the dissonant ones not available from notes of the tempered scale. Consequently, the typical organ of this type omits the seventh harmonic, and terminates the harmonic structure with the eighth. With a complete absence of dissonant harmonics not found at tempered scale frequencies, the character of voices containing these harmonics suffers greatly, often to the point of nonrecognition. Even the addition of one or two of the dissonant harmonics such as the seventh and eleventh results in marked improvements in simulating organ voices.

In my copending application Ser. No. 461,568, filed May 17, 1965, entitled, Complementary Harmonic System for Flute Type Organs, there is shown and described a system for solving this problem by providing a supplemental set of composite generators, one for each note. Each provides signals corresponding to the missing upper order harmonics. The provision of a second set of composite generators is costly; furthermore, the relative amplitude of the harmonics included in the composite generator cannot be controlled. The primary object of this invention is to provide a new and improved system for adding harmonics. Another object of this invention is to provide a system of this character which does not require any supplemental generator sets, but instead, one device for each harmonic added. To achieve these results, I provide a proportional frequency changing device for each added harmonics, the frequency changing device having a common input cooperable with generators for all of the notes of the organ.

An acceptable frequency changing device of this character is one in which a tape moves past a pickup head at an effective rate proportionately different from the rate at which it moves past a recording head.

Another object of this invention is to provide an inexpensive system of this character in which adjustments for maintaining tuning are readily accomplished.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Detailed description

Figure 1:
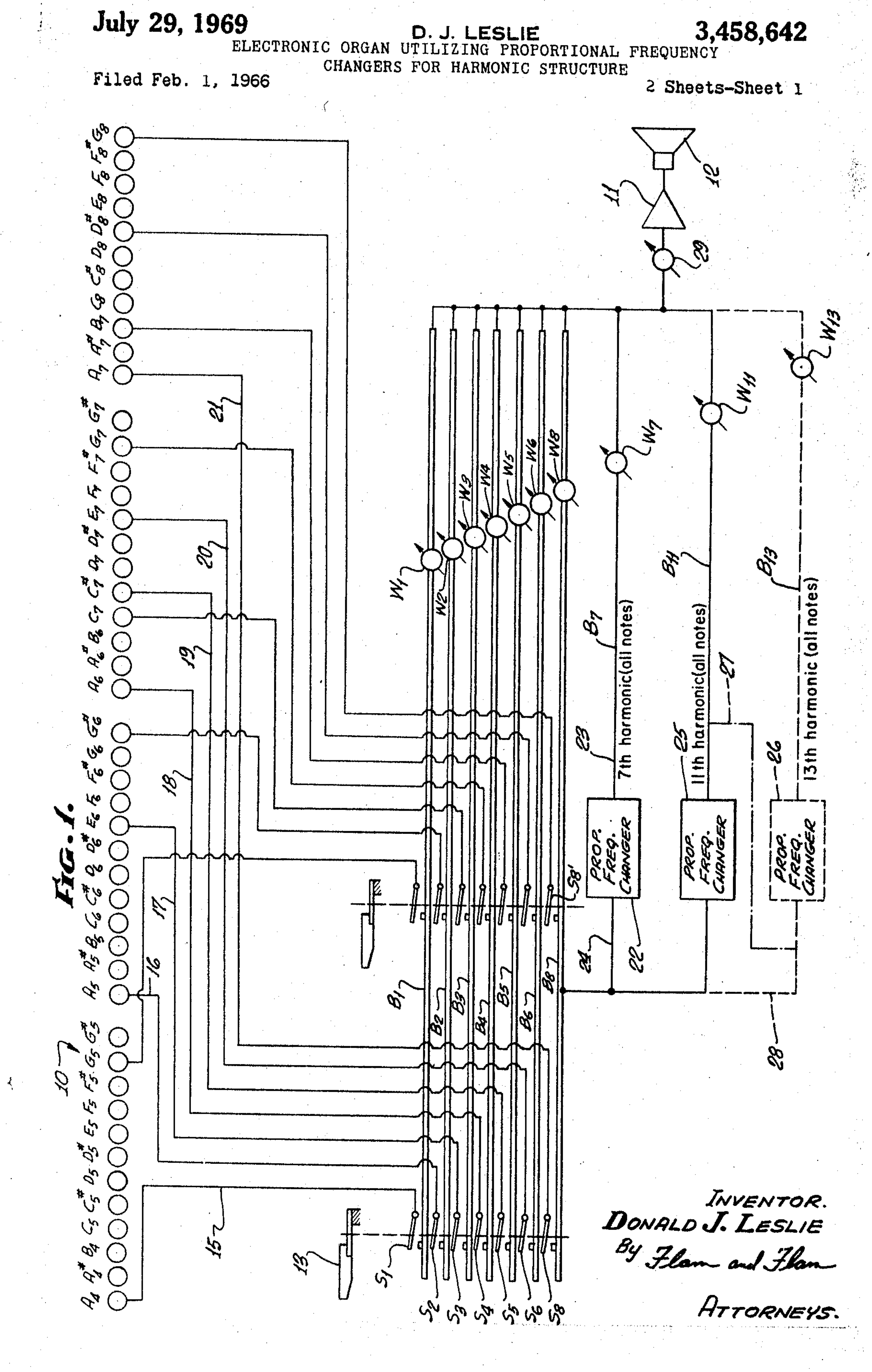
FIGURE 1 is a digrammatic view of an electronic organ incorporating the present invention.

In FIG. 1, a series of sinusoidal generators 10 is illustrated having frequencies corresponding to the fundamentals of the notes indicated by the legends adjoining the generators 10. Also indicated in FIG. 1 are an output power amplifier 11 and a transducer 12, indicated diagrammatically, in this instance, as a speaker.

In order to obtain a complex wave form at the output 11–12, a borrowing system is provided. For this purpose, each key 13 has associated therewith a set of switches designated as $S_1$, $S_2$, $S_3$, $S_4$, $S_5$, $S_6$ and $S_8$. The key 13 and switches illustrated are for the note $A_4$, by way of example. The switch $S_1$, and by the aid of a connection 15, is adapted to connect the generator 10 for $A_4$ to a bus bar $B_1$. This bus bar is connected to the input of the amplifier 11 via an adjustable control $W_1$, which may be a potentiometer, autotransformer, or any other suitable element. The bus bar $B_1$ is engaged by all of the switches $S_1$ for all of the keys typified by the key 13. Accordingly, if the element $W_1$ is adjusted for substantial signal transmission, all of the fundamentals for the various notes will be operative.

The adjustable control element $W_2$ is adapted to determine the extent that second harmonics are present at the output. The second switches $S_2$ for each switch set cooperate with a single bus bar $B_2$ for this purpose. Thus the switch $S_2$ for the note $A_4$ by the aid of a lead 16, when the key 13 is depressed, connects the $A_5$ generator 10 to the bus bar $B_2$. Similarly, the switch $S_2$ associated with the key for note $G_4$ (not shown) will connect with the generator for $G_5$.

The switches $S_3$, $S_4$, $S_5$, $S_6$ and $S_8$ for the $A_4$ group similarly connect by the aid of leads 17, 18, 19, 20 and 21 to generators for $E_6$, $A_6$, $C\#_7$, $E_7$ and $A_7$. Bus bars $B_3$, $B_4$, $B_5$, $B_6$ and $B_8$ are provided and serve as third, fourth, fifth, sixth and eighth harmonic bus bars, cooperable with switches for the other notes. Adjustable circuit elements $W_3$, $W_4$, $W_5$, $W_6$ and $W_8$ are likewise provided to control the relative strength of the third, fourth, fifth, sixth and eighth harmonics.

Generators for $E_6$, $C\#_7$ and $E_7$ have frequencies corresponding quite closely to three, five and six times the frequency of the generator $A_4$. However, there are no generators in the set 10 having frequencies closely corresponding to the seventh, eleventh and other higher harmonics. In order to create seventh harmonics, the frequencies of all signals aplied to one of the bus bars, in this instance the eighth harmonic bus bar $B_8$, are proportionately changed. This is done by a proportional frequency changer 22.

The frequency changer 22 is interposed in a lead $B_7$. One end of the lead $B_7$ connects to the bus bar $B_8$ at a place where the eighth harmonic appears in full strength, namely, in advance of the adjustable circuit element $W_8$. The other end of the lead $B_7$ connects via an adjustable circuit element $W_7$ to the amplifier 11 and transducer 12. The frequency changer 22 serves to change the frequency of signals at its output connection 23 relative to its input connection 24. In order properly to derive a seventh harmonic from the eighth harmonic bus bar $B_8$, the proportionate relationship is 7:8. For example, when the key 13 is depressed, a signal is applied to the input connection 24 via lead 21 that has a frequency of 3520 cycles per second. This signal is changed in frequency by a factor of 7/8, and accordingly appears at the output connection 23 as a signal of 3080 c.p.s., which corresponds to the seventh harmonic of $A_4$. The frequency changer includes suitable amplifiers so that the signal strength at the output connection 23 is restored to the same level as at the input connection 24.

Similarly, when the key corresponding to the note $G_5$ (783.99), for example, is depressed, the key switch $S_8'$ applies a signal corresponding to the eighth harmonic of $G_5$, namely, 6271.92 c.p.s., and as derived from the generator $G_8$. The proportional frequency changer 22 likewise operates upon this signal to reduce it by the factor of 7/8, and a signal 5487.93 c.p.s. appears at the output connection 23 which corresponds to the seventh harmonic of $G_5$. In a like manner, the frequency changer 22 operates upon all signals applied to the eighth harmonic bus bar $B_8$ thus to derive seventh harmonics.

A proportional changer 25 in a like manner cooperates with the bus bar $B_8$ to create eleventh harmonics. Accordingly, the operating ratio of the frequency changer 25 is 11/8. Additional frequency changers 26, etc. may be provided for the thirteenth and other harmonics in a like manner. By deriving the signal from a close harmonic, the ratio of each frequency changer is kept as close as possible to unity.

If desired, each frequency changer could be serially associated with the others, as indicated for example by the dot-and-dash lead 27. Thus, if the frequency changer 26 were connected serially with the frequency changer 25 instead of to the bus bar $B_8$ as indicated by the lead 28, the ratio of operation of the frequency changer 26 could be 13/11 rather than 13/8.

Each of the leads $B_7$, $B_{11}$, $B_{13}$, etc. is controlled by the respective adjustable elements $W_7$, $W_{11}$, $W_{13}$, etc., whereby the harmonic structure of a tone may be synthesized. An adjustable circuit element 29 associated with the amplifier 11 may be linked to a swell pedal proportionately to control the volume of the composite tone.

Figure 2:
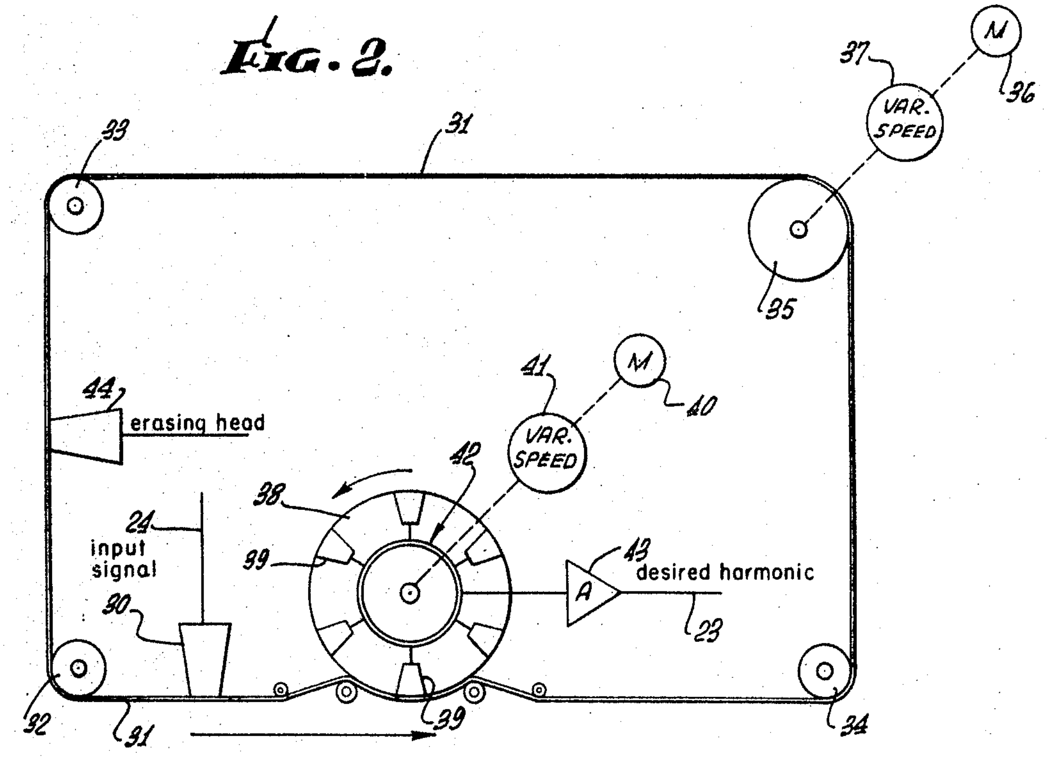
FIG. 2 is a diagrammatic view of a proportional frequency changer.

One of the frequency changers 22 is illustrated diagrammatically in FIG. 2. The frequency changer includes a recording head 30 cooperable with the input connection 24. A high speed tape 31, wire or other recording medium is transported past the recording head 30 at high speed. In this instance, the tape is shown as of endless form cooperable with idler pulleys 32, 33 and 34 and a drive pulley 35. The drive pulley 35 is operated at a selected set speed by a motor 36 and a variable ratio drive 37 adjustable preferably through a continuous range. The motor 36 may be of a synchronous type. Optionally, the speed of the tape 31 may be regulated by a variety of known means.

Promptly after passing the recording head 30, the tape 31 moves past a pickup head 38. This pickup head has a substantially circular or cylindrical periphery at which a series of equiangularly and closely spaced pickup elements 39 are exposed for cooperation with the tape 31. The pickup head 38 is mounted for rotation so as to move tangent to the tape 31, and it is operated at a selected set speed by the aid of a motor 40 and a variable ratio drive 41 similar to the drive 37. The motor 40 may likewise be of the synchronous type. Optionally, the speed of the head 38 may be regulated by other known means.

The pickup elements 39 connect in parallel to the output connection 23, as by the aid of a slip ring structure 42, shown as a single wire for convenience. This slip ring structure 42 may be of the type shown and described in my prior Patent No. 3,014,192, issued Dec. 19, 1961, and entitled Mercury Slip Ring Assembly. Interposed in the lead is an amplifier 43 having a gain set or otherwise adjusted so as to balance the amplitude of the signal in the output connection 23 relative to its amplitude in the input connection 24.

The pickup head 38 is rotated, in this instance, in a counterclockwise direction so that the peripheral speed of the pickup head realtive to the tape 31 is 7/8 of the speed of the tape 31 past the recording head 30. Since the speed of the tape 31 relative to the pickup head 38 is only 7/8 of what it is relative to the recording head 30, the frequencies of the signals are scaled to produce seventh harmonics.

In the present instance, the pickup head is shown as the rotatable element. In practice, either the recording head 30 or the pickup head 38 could be movable in order to create different rates of motion of the tape relative to the heads.

Each pickup element moves into operative relationship with the tape as the adjoining element moves out of operative relationship. In effect, stretched segments of the tape are joined together, and other segments are operatively omitted. The omitted segments occupy an extremely short space of time relative to the progress of the music. The discontinuities are not perceived. The tape 31 moves at high speed such that the lag between the playing of the note and the creation of the tone at the output is likewise imperceptible.

The frequency changers 25 and 26 are identical except that the pickup heads will rotate at different speeds and in order to increase the frequencies, in the opposite direction relative to the tape. In these instances, the tape is effectively compressed, and partially repeated. Again discontinuities are not perceived. Apparatus of this general character is available commercially from Gotham Audio Corporation of New York. An erasing head 44 is located in advance of the recording head 30.

Figure 3:
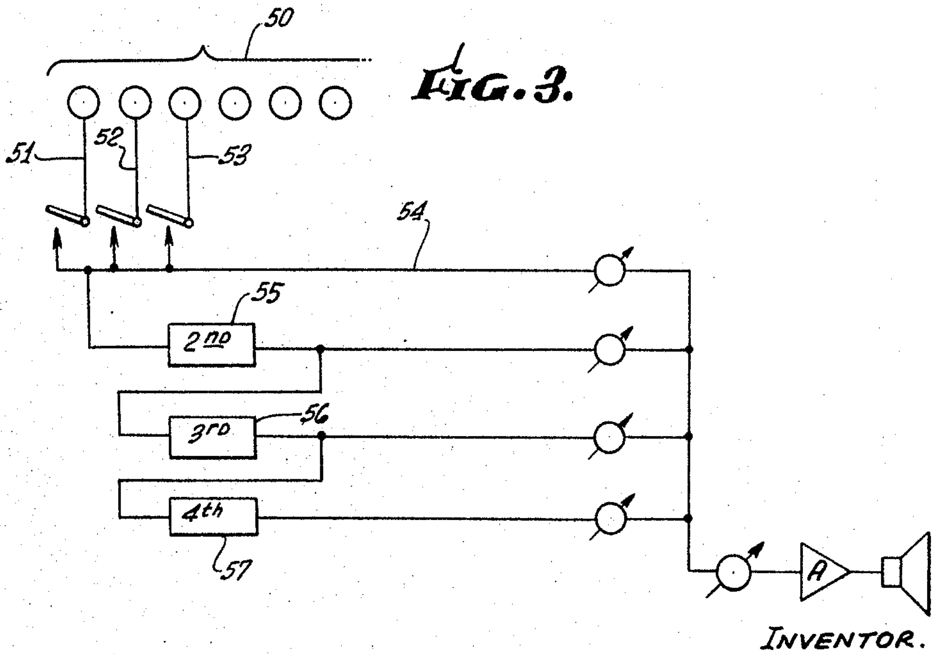
FIG. 3 is a diagrammatic view of a modified form of the present invention.

In the form of the invention illustrated in FIG. 3, the set of generators 50 are each provided with but one lead, as at 51, 52, 53, etc., and only a fundamental bus bar 54 is provided. The second, third, fourth and other harmonics are created by proportional frequency changing devices 55, 56 and 57 that all derive signals directly or indirectly from bus bar 54. The third harmonic frequency changer 56 derives a signal from the second harmonic frequency changer, and the fourth harmonic frequency changer derives a signal from the third harmonic frequency changer, etc. In this manner, the speed ratios are 2:1, 3:2, 4:3, 5:4, etc. Only a single key contact is required for harmonic structure purposes.

The inventor claims:

1. In an electronic organ: a set of substantially sine wave generators for the notes of the organ; an audio output channel; a bus lead connectible with said audio output channel; keys for the notes; a key switch for each note and operated by the corresponding key for operatively connecting the corresponding generator to said bus lead; a proportional frequency changer having an input operatively connected to said bus lead and an output operatively connected to said audio output channel, said frequency changer having a predetermined characteristic proportionality constant to provide signals corresponding to a certain harmonic of all signals applied to said bus lead.

2. The combination as set forth in claim 1 in which each of said frequency changers includes a recording head, a pickup head and a record medium transportable relative to said heads, one of said heads being rotatable whereby the rate of movement of the medium relative to one head differs from its rate of movement relative to the other head by a selected ratio, and means for rotating said rotatable head.

3. In an electronic organ: a set of substantially sine wave generators for the notes of the organ; an audio output channel; a bus lead connectible with said audio output channel; keys for the notes; a key switch for each note and operated by the corresponding key for operatively connecting the corresponding generator to said bus lead; a set of proportional frequency changers each having an input operatively connected directly or indirectly to said bus lead, and each having an output operatively connected to said audio output channel, said frequency changers having predetermined characteristic proportionality constants to provide signals corresponding to certain different harmonics of all signals applied to said bus lead.

4. The combination as set forth in claim 3 in which each of said frequency changers includes a recording head, a pickup head and a record medium transportable relative to said heads, one of said heads being rotatable whereby the rate of movement of the medium relative to one head differs from its rate of movement relative to the other head by a selected ratio, and means for rotating said rotatable head.

5. In an electronic organ: a set of substantially sine wave generators for the notes of the organ; a set of bus leads corresponding to the fundamental, second, third, fourth, fifth, sixth and eighth harmonics; keys for the notes; a set of key switches for each note and operated by the corresponding key and cooperable respectively with the bus leads; connection means between the key switches and those generators corresponding substantially to the fundamental, second, third, fourth, fifth, sixth and eighth harmonics of the corresponding note; said connections being arranged so that each bus lead transmits corresponding harmonics; a set of proportional frequency changers having inputs connected directly or indirectly to the bus leads, each frequency changer having a predetermined characteristic proportionality constant to provide the seventh, eleventh, thirteenth and other harmonics; and an audio output channel connected to said bus leads and to the outputs of said frequency changers.

6. The combination as set forth in claim 5 in which each of said freqency changers includes a recording head, a pickup head and a record medium transportable relative to said heads, one of said heads being rotatable whereby the rate of movement of the medium relative to one head differs from its rate of movement relative to the other head by a selected ratio, and means for rotating said rotatable head.

7. The combination as set forth in claim 1 together with an adjustable circuit element interposed between said bus lead and said audio output channel, and another adjustable circuit element interposed between said frequency changer and said audio output channel; said adjustable circuit elements being operative to scale the signals transmitted, thereby to form tone characteristics.

8. The combinaion as set forth in claim 7 in which each of said frequency changers includes a recording head, a pickup head and a record medium transportable relative to said heads, one of said heads being rotatable whereby the rate of movement of the medium relative to one head differs from its rate of movement relative to the other head by a selected ratio, and means for rotating said rotatable head.

9. The combination as set forth in claim 3 together with an adjustable circuit element interposed between said bus lead and said audio output channel, and additional adjustable circuit elements respectively interposed between said frequency changers and said audio output channel; said adjustable circuit elements being operative to scale the signals transmitted, thereby to form tone characteristics.

10. The combination as set forth in claim 9 in which each of said frequency changers includes a recording head, a pickup head and a record medium transportable relative to said heads, one of said heads being rotatable whereby the rate of movement of the medium relative to one head differs from its rate of movement relative to the other head by a selected ratio, and means for rotating said rotatable head.

11. The combination as set forth in claim 5 together with an adjustable circuit element interposed between each of said bus leads and said audio channel, and between the outputs of said frequency changers and said audio output channel; said adjustable circuit elements being operative to scale the signals transmitted, thereby to form tone characteristics.

12. The combination as set forth in claim 11 in which each of said freqency changers includes a recording head, a pickup head and a record medium transportable relative to said heads, one of said heads being rotatable whereby the rate of movement of the medium relative to one head differs from its rate of movement relative to the other head by a selected ratio, and means for rotating said rotatable head.

References Cited

UNITED STATES PATENTS

| | | | |
|---|---|---|---|
| 2,006,961 | 7/1935 | Moore | 179—100.2 X |
| 2,478,973 | 8/1949 | Mahren | 84—1.23 X |
| 2,645,969 | 7/1953 | Daniel | 84—1.28 |
| 3,334,173 | 8/1967 | Young | 84—1.21 X |

HERMAN KARL SAALBACK, Primary Examiner

F. PRINCE BUTLER, Assistant Examiner

U.S. Cl. X.R.

84—1.22; 179—100.2; 321—60; 328—25